US008309230B2

(12) United States Patent
Karim et al.

(10) Patent No.: US 8,309,230 B2
(45) Date of Patent: Nov. 13, 2012

(54) MULTILAYER NANOCOMPOSITE BARRIER STRUCTURES

(75) Inventors: Douglas P. Karim, Green Brook, NJ (US); Harris A. Goldberg, Edison, NJ (US); Carrie A. Feeney, Bridgewater, NJ (US); Michele Farrell, Bethlehem, PA (US)

(73) Assignee: Inmat, Inc., Hillsborough, NJ (US)

( * ) Notice: Subject to any disclaimer, the term of this patent is extended or adjusted under 35 U.S.C. 154(b) by 1551 days.

(21) Appl. No.: 11/272,351

(22) Filed: Nov. 10, 2005

(65) Prior Publication Data

US 2006/0110615 A1     May 25, 2006

Related U.S. Application Data

(60) Provisional application No. 60/627,240, filed on Nov. 12, 2004.

(51) Int. Cl.
    *B32B 27/00* (2006.01)
(52) U.S. Cl. ........ 428/500; 428/323; 428/324; 428/327; 428/331; 428/517; 428/34.5; 428/34.4; 428/34.6; 428/34.7; 428/36.4; 428/704; 428/913; 428/36.6
(58) Field of Classification Search ........................ None
    See application file for complete search history.

(56) References Cited

U.S. PATENT DOCUMENTS

| 4,528,235 A | 7/1985 | Sacks et al. ............... 428/220 |
| 4,536,425 A | 8/1985 | Hekal ........................ 428/35 |
| 4,911,218 A | 3/1990 | Patitsas ..................... 152/525 |
| 4,960,639 A | 10/1990 | Oda et al. ................. 428/34.5 |
| 4,983,432 A | 1/1991 | Bissot ....................... 428/35.7 |
| 5,049,609 A | 9/1991 | Patitsas ..................... 524/386 |
| 5,091,467 A | 2/1992 | Beers ......................... 525/57 |
| 5,667,886 A * | 9/1997 | Gough et al. ............... 428/331 |
| 6,087,016 A * | 7/2000 | Feeney et al. .............. 428/454 |
| 6,232,389 B1 * | 5/2001 | Feeney et al. .............. 524/450 |
| 6,376,057 B1 * | 4/2002 | Akao et al. ................. 428/215 |
| 6,838,507 B2 | 1/2005 | Chou et al. ................. 524/445 |
| 2002/0086908 A1 | 7/2002 | Chou et al. ................. 516/98 |
| 2003/0059601 A1 * | 3/2003 | Tokiyoshi et al. ........... 428/328 |
| 2003/0114247 A1 * | 6/2003 | Cavallaro et al. ........... 473/357 |
| 2005/0059769 A1 | 3/2005 | Chou et al. ................. 524/445 |

FOREIGN PATENT DOCUMENTS

| JP | 11-246729 | 9/1999 |
| WO | WO93/04118 | 3/1993 |

OTHER PUBLICATIONS

E. L. Cussler et al, J. Membrane Sci. 38:161-174 (1988); W. J. Ward et al, J. Membrane Sci., 55:173-180 (1991); Chang, J. et al, Journal of Applied Polymer Science, vol. 84, 2294 (2002); Yano, K. et al, Journal of Polymer Science A: Polymer Chemistry, 35, 2289 (1997); Lan, T. et al, Chem. Mater. 6, 573 (1994).

(Continued)

*Primary Examiner* — Jennifer McNeil
*Assistant Examiner* — Vera Katz
(74) *Attorney, Agent, or Firm* — Michael W. Ferrell

(57) ABSTRACT

A multilayer barrier structure includes a plurality of relatively thin nanocomposite layers separated by one or more relatively thick intermediate layers selected from synthetic elastomers or non-elastomeric polymers. The composites exhibit remarkably long breakthrough and lag-times and are useful for packaging or protective apparel.

17 Claims, 11 Drawing Sheets

Time Lag for Multilayer Films

OTHER PUBLICATIONS

L.E. Nielsen, Journal of Macromolecular Science, Chemistry A1,929,(1967); R.K. Bharadwaj, "Modeling the Barrier Properties of Polymer-Layered Silicate Nanocomposites", Macromolecules 34, 9189 (2001); G.H. Fredrickson and J. Bicerano, "Barrier properties of oriented disk composites", Journal of Chemical Physics 110, 2181 (1999).

W.J. Ward et al. "Gas Barrier Improvement Using Vermiculite and Mica in Polymer Films", Journal of Membrane Science, 55:173-180 (1991); J.A. Barrie et al., Trans. Faraday Soc., "Diffusion and Solution of Gases in Composite Rubber Membranes", 59, 869 (1963); R. Ash et al., Br. J. Appl. Phys., "Diffusion in Multiple Laminates", 16, 873 (1965); J. Crank, "Diffusion in Heterogeneous Media", Oxford University Press, Chap. 12 (1975); and R.S. Lindsay "Swatch Test Results of Commercial Chemical Protective Gloves to Challenge by Chemical Warfare Agents: Summary Report", Feb. 2001.

* cited by examiner

References: Elspass, C.W. et.al. US 5,807,629
Bissot, T.C. US 4,818,782
Blatz, P.S. US 5,110,855
Xanthos, M. et.al. Intern. Polym. Proc. XIII, 1998, 58
Elspass, C.W, et al. US 6,034,164

Figure 4
Three Layer Construction
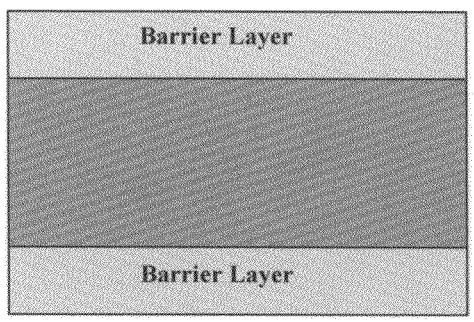
Two Layer Construction
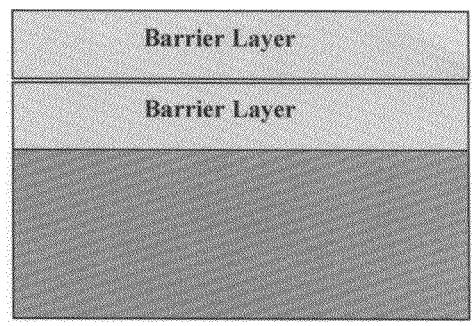
$$T_{lag123} = \frac{\frac{t_1^2}{D_1}\left(\frac{t_1}{6D_1S_1}+\frac{t_2}{2D_2S_2}+\frac{t_3}{2D_3S_3}\right)+\frac{t_2^2}{D_2}\left(\frac{t_1}{2D_1S_1}+\frac{t_2}{6D_2S_2}+\frac{t_3}{2D_3S_3}\right)+\frac{t_3^2}{D_3}\left(\frac{t_1}{2D_1S_1}+\frac{t_2}{2D_2S_2}+\frac{t_3}{6D_3S_3}\right)+\frac{S_2 t_1 t_2 t_3}{D_1 D_3 S_1 S_3}}{\frac{t_1}{D_1 S_1}+\frac{t_2}{D_2 S_2}+\frac{t_3}{D_3 S_3}}$$

Figure 6 - Time Lag for Multilayer Films

MULTILAYER NANOCOMPOSITE BARRIER STRUCTURES

CLAIM FOR PRIORITY

This application is based on Provisional U.S. patent application Ser. No. 60/627,240 of the same title which was filed on Nov. 12, 2004, the disclosure of which is incorporated into this application in its entirety by reference thereto and the priority of which is hereby claimed.

This invention was made under support from a contract with an agency of the United States. The name of the U.S. Government agency and the Government contract number are: Department of Defense, US Army, Robert Morris Acquisition Center, Natick Contracting Division, Contract No. DAAD16-03-C-0041. The Government has certain rights in this invention.

TECHNICAL FIELD

The present invention relates to nanocomposite barrier films and in particular to barrier composites with at least two distinct nanocomposite barrier layers separated by one or more intermediate layers. The structures exhibit greatly enhanced breakthrough times for permeative agents such as oil, grease or hazardous chemicals.

BACKGROUND OF INVENTION

Barrier coatings (layers) which prevent, reduce, or inhibit the permeation of a selected substrate with a gas, vapor, chemical and/or aroma have been widely described, and such coatings are used in a variety of industries, e.g., the packaging industries, automobile industries, paint industries, tire industries etc. Typical barrier materials used in coatings include polyesters, PVDC, polyurethanes, acrylic polymers, etc.

It is well known that the barrier properties of a polymer can be improved by the addition of impermeable plate like structures. When the plates are oriented perpendicular to the diffusion (permeation) direction, the diffusing molecules must go around the plates. This leads to significant reductions in the permeability of the polymer. See, for example, E. L. Cussler et al, *J. Membrane Sci.* 38:161-174 (1988); W. J. Ward et al, *J. Membrane Sci.*, 55:173-180 (1991); Chang, J. et al, *Journal of Applied Polymer Science*, Vol. 84, 2294 (2002); Yano, K. et al, *Journal of Polymer Science A: Polymer Chemistry*, 35, 2289 (1997); Lan, T. et al, *Chem. Mater.* 6, 573 (1994); Messersmith, P. B. and Giannelis, E. P, *Journal of Polymer Science A: Polymer Chemistry* 33,1047 (1995); U.S. Pat. Nos. 4,528,235; 4,536,425; 4,911,218; 4,960,639; 4,983,432; 5,091,467; and 5,049,609; and International Patent Application No. WO93/04118, published Mar. 4, 1993, among others.

Control of permeation using relatively low aspect ratio platelets, at low concentrations, and thermoplastically processed at high shear rates has been previously disclosed. See, for example, E. L. Cussler et al, *J. Membrane Sci.* 38:161-174 (1988); L. E. Nielsen, *Journal of Macromolecular Science, Chemistry* A1,929,(1967); R. K. Bharadwaj, "Modeling the Barrier Properties of Polymer-Layered Silicate Nanocomposites", *Macromolecules* 34, 9189 (2001); G. H. Fredrickson and J. Bicerano, "Barrier properties of oriented disk composites", *Journal of Chemical Physics* 110, 2181 (1999). These conditions lead to relatively small improvements in the barrier properties of the polymer. This is because the reduction in permeability varies rapidly with the aspect ratio and the concentration of plates when the plates are well aligned. If the plates are not well aligned, the reductions in permeability are further reduced. The targeted application of these earlier efforts was not coatings, but a bulk polymer with improved barrier and/or mechanical properties.

Exfoliated silicates have been used to produce nanocomposite coatings by several methods. The most widely used has been by combining a dissolved polymer with exfoliated filler. Water-soluble polymers such as polyvinyl alcohol (PVOH) have been combined with water exfoliated filler such as vermiculite. See, for example, Japan patent 11-246729, Sep. 14, 1999, "Gas-Barrier Poly(vinyl alcohol)/poly (acrylic acid) Compositions and their Laminates and Shaped Articles". Sumitomo Chemical Co., Ltd. Polycarbonate dissolved in toluene has been combined with organically functionalized filler and reportedly forms good barrier coatings. See, for example, W. J. Ward et al, "Gas Barrier Improvement Using Vermiculite and Mica in Polymer Films", *Journal of Membrane Science*, 55:173-180 (1991). Other polymers have also been made into barrier coatings by dissolving them in a solvent, and using an organically functionalized filler in an effort to improve the barrier properties. See, for example, Yano, K., et al, "Synthesis and properties of polyimide-filler hybrid composites", *Journal of Polymer Science A: Polymer Chemistry*, 35, 2289 (1997).

Processes for utilizing emulsion polymerization procedures for preparing aqueous polymer/clay nanocomposite dispersions are disclosed in U.S. Pat. No. 6,838,507; US Patent Applications 2005/0059769 and 2002/0086908 (all to Rohm and Haas). The disclosed processes include both in-situ polymerizations in the presence of at least partially exfoliated unmodified clays as well as admixtures of polymer dispersions with at least partially exfoliated unmodified clay dispersions. The disclosed nanocomposite dispersions are useful for preparing a variety of materials, such as coatings, adhesives, caulks, sealants, plastics additives, and thermoplastic resins. Processes for preparing polymer clay nanocomposite powders and use of these powders as plastic resins and plastics additives are also disclosed.

While nanocomposites exhibit relatively low steady state permeation rates, it has been found that significant improvement in breakthrough times can be achieved with the same nanocomposite coatweight by interposing another layer between nanocomposite layers.

SUMMARY OF THE INVENTION

The present invention is directed generally to multilayer barrier structures including: (a) a first nanocomposite layer including a first polymer and a first exfoliated filler; (b) a second nanocomposite layer including a second polymer and a second exfoliated filler; and (c) at least one intermediate layer interposed between the first and second nanocomposite layers, the intermediate layer being made from a dense or foamed synthetic elastomer and/or non-elastomeric polymers, (or non-elastomeric polymers derived from wood or other plants, and non-woven, papers, or foams made from such polymers). The multilayer barrier structures of the present invention exhibit remarkable breakthrough times as will be appreciated from the discussion which follows. The structures are thus useful as oxygen or moisture barriers, oil and grease barriers or as barrier protection for hazardous chemicals.

Optionally, the nanocomposite layers or the intermediate layer(s) therebetween contain absorbers or getters. When a film or coating limits the diffusion of any molecule or chemical, it is well known that the penetration of the said molecule can be further reduced by the addition of absorbers or getters to either the coating, or in a layer or material below the coating. This concept is used commercially, for example, in Honeywell's AEGIS™ Nylon films to block the diffusion of oxygen. It is clear that the same concept can be used in conjunction with nanocomposite coatings and laminates to block the penetration of oxygen, water, oil or grease, chemical warfare agents, or any other material. The use of such absorbers will not have a large effect on the steady state permeability, but it will primarily affect the time it takes for the first molecules to diffuse through the system. This breakthrough time is most important in packaging, chemical protective, and electronic applications as will be further appreciated from the discussion which follows.

BRIEF DESCRIPTION OF DRAWINGS

The invention is described in reference to the various Figures wherein:

FIG. 4 shows various multilayer barrier structures as well as an equation for a time lag for diffusion;

DETAILED DESCRIPTION

Figure 1:
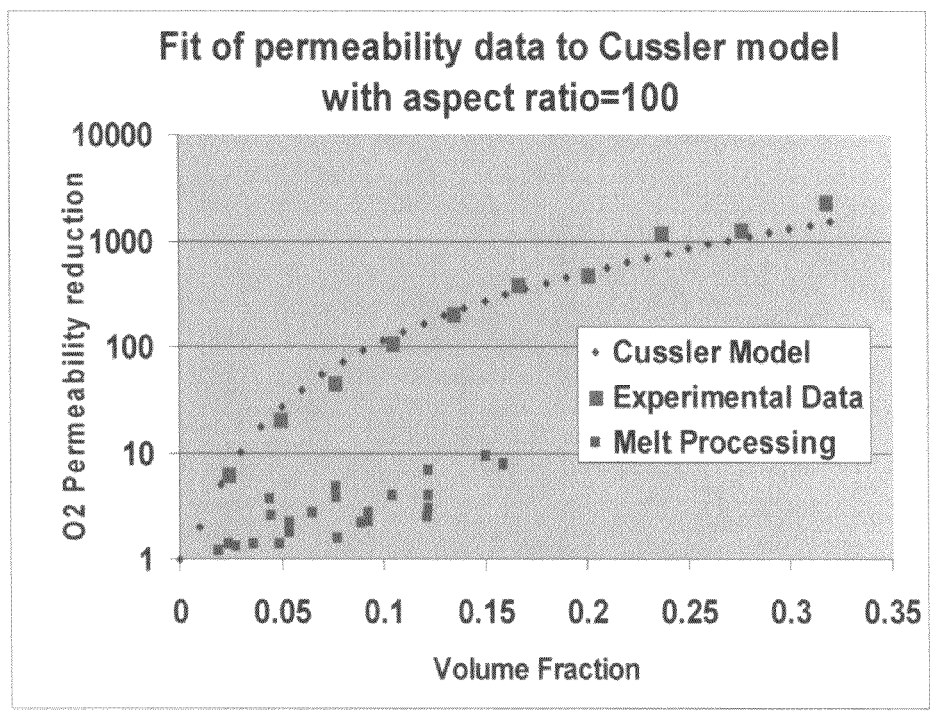
FIG. 1 is a plot of permeability reduction versus filler volume fraction.

Terminology as used herein is given its ordinary meaning in the art. Mils, or mil, for example, refers to thousandths of an inch. Film, for example includes continuous film and microporous film. Continuous film is preferred in most cases.

As used herein, the phrase "non-elastomeric polymer," and like terminology, includes those polymeric materials with glass transition temperatures ($T_g$) above room temperature, i.e., 23° C., and/or with crystallinity above 10%. Typically, non-elastomeric polymers can be viewed as polymers that even when properly crosslinked and not filled with inorganic fillers cannot be stretched at room temperature to twice their length and then return to their original shape. This definition refers to the properties of the polymer, and not to the filled or final nanocomposite coating. Suitable non-elastomeric polymers include polyolefins and polyesters, for example.

Synthetic elastomers include, without limitation, butyl rubbers, neoprene and the like as well as olefinic thermoplastic elastomer (TPO); polyamide thermoplastic elastomer (Polyamide TPE); polybutadiene thermoplastic elastomer, e.g., syndiotactic 1,2-polybutadiene thermoplastic elastomer (polybutadiene TPE); polyester thermoplastic elastomer (Polyester TPE); polyurethane thermoplastic elastomer (TUPR), for example, thermoplastic polyester-polyurethane elastomer (TPAU), and thermoplastic polyether-polyurethane elastomer (TPEU); styrenic thermoplastic elastomer (Styrenic TPE); vinyl thermoplastic elastomer, e.g., polyvinyl chloride polyol (pPVC). Still other suitable synthetic elastomers include acrylic rubber, such as ethylene-acrylate copolymer (EACM); and butadiene rubber, such as polybutadiene.

Butyl rubbers useful in connection with this invention include: butyl rubbers such as isobutylene-isoprene copolymer (IIR); bromobutyl rubber, e.g., bromoisobutylene-isoprene copolymer (BIIR); chlorobutyl rubber, e.g., chloroisobutylene-isoprene copolymer (CIIR); and isobutylene rubber. Butyl rubbers are generally defined as a poly(isobutylene) homopolymer or a copolymer of poly(isobutylene) with isoprene. Modified butyl rubbers include halogenated poly(isobutylene) and its copolymers and isoprene. Additional polymers or copolymers that contain more than 50% isobutylene are also useful in the practice of this invention, for example, poly(isobutylene-co-acrylonitrile), etc. Other butyl-containing polymers, which are cured, partially cured or uncured, may be readily selected by one of skill in the art.

Still other useful elastomeric polymers are chlorosulfonated polyethylene rubber, e.g., chlorosulfonated polyethylene (CSM); epichlorohydrin rubber, such as polyepichlorohydrin (CO), polyepichlorohydrin copolymer (CO copolymer); ethylene-propylene rubber (EPR), such as ethylene-propylene copolymer (EPM), ethylene-propylene-diene copolymer (EPDM).

Other polymers which may be used include fluoroelastomers, such as vinylidene fluoride-hexafluoropropylene copolymer (FKM); natural rubber (NR); neoprene rubber such as polychloroprene (CR); nitrile rubber, such as acrylonitrile-butadiene copolymer (NBR); polysulfide rubber; polyurethane, such as polyester urethane (AU), and polyether urethane (EU); propylene oxide rubber; silicone rubber, such as silicone (MQ), and methylvinyl-fluorosilicone (FVMQ) and styrene-butadiene rubber, such as styrene-butadiene copolymer (SBR).

Particularly preferred polymers include butyl rubbers, such as polyisobutylene, and EP rubbers, including EPDM.

The term "nanocomposite" or "filled polymer nanocomposite" refers to the mixture of substantially exfoliated filler and polymer. The thickness of at least some filler particles is below 1 micron, and probably well below 100 nm.

"Exfoliation" is defined for layered fillers as the separation of individual layers of the original particle. The fillers are exfoliated so that the polymer may surround each particle. Desirably, a sufficient amount of polymer is present between each platelet, that the platelets are randomly spaced. Preferably, no X-ray line appears because of the substantially random spacing of exfoliated platelets. In some circumstances, the filler can exfoliate when dispersed in an aqueous or non-aqueous medium. This would result in a higher aspect ratio than that of a solid particle before dispersion.

Other terminology should be clear from its context provided herein.

The present invention resides, in part, in nanocomposite coatings whereby the steady state permeation rate is more than 10 times lower than the unfilled polymer which can be coated on more traditionally used polymeric substrates. These coatings provide large reductions in the steady state permeation rate even when they are much thinner than the substrate material. The performance is due to the fact that the well dispersed clay fillers provide a large decrease in the effective diffusion constant for permeants moving across the film. It is well known that the breakthrough time for a permeant depends not only on the diffusion constant, but also on the thickness of the layers. Thus one finds that a single barrier layer that is very thin will typically have a much larger effect on the steady state permeation rate than it does on the breakthrough time. Particular materials for nanocomposite layers and substrates are described in the following copending patent applications, the disclosures of which are hereby incorporated into this application in their entirety by reference thereto:

U.S. Ser. No. 11/113,349, filed Apr. 22, 2005, entitled "Barrier Mixtures Containing Elastomeric Acrylic Polymer With Silicate Filler and Coated Articles" of Feeney et al.

U.S. Ser. No. 10/741,741, filed Dec. 19, 2003, entitled "Barrier Coating of a Non-Elastomeric Polymer and a Dispersed Layered Filler in a Liquid Carrier and Coated Articles" of Feeney et al.

U.S. Ser. No.10/741,251, filed Dec. 19, 2003, entitled "Barrier Coating of a Non-Butyl Elastomer and a Dispersed Layered Filler in a Liquid Carrier and Coated Articles" of Feeney et al.

U.S. Ser. No. 10/742,542, filed Dec. 19, 2003, entitled "Barrier Coating of a Mixture of Cured and Uncured Elastomeric Polymers and a Dispersed Layered Filler in a Liquid Carrier and Coated Articles" of Feeney et al.

This invention is particularly directed to, in part, multilayer structures that combine clay—polymer nanocomposite layers in a novel design that can lead to very large increases in the breakthrough time. This is critical in applications such as packaging or protection from hazardous materials, where the breakthrough time is more important than steady the state permeation rate. One type of application where breakthrough time is more important than steady state permeation rate is oil and grease barriers used in food packaging. Thus, in one aspect, this invention is directed to a method of creating barrier structures, and those structures, which have significantly longer breakthrough times for gasses, vapors, oil and greases and other chemicals. In particular, the invention uses nanocomposite barrier coatings which have a much lower effective diffusion constant than the unfilled polymer on which they are based, and which have a much lower permeation rate than the substrate on which they are employed. In this case, the improved barrier is caused by the tortuous path the permeant must take through the polymer used in the nanocomposite barrier coating.

The breakthrough time is approximately proportional to the thickness squared and inversely proportional to the diffusion constant for a uniform slab of a single material. Thus thin films have a very short breakthrough time. When a very thin barrier coating is put on a very permeable substrate, the steady state permeation rate can be changed significantly, while the changes in breakthrough time can be much smaller.

The steady state permeation rate does not depend on how a thin barrier material is deployed on a more permeable substrate. This means that if the total thickness of the barrier material and substrate is the same, the steady state permeation rate will be the same for samples with a single barrier layer as it is for the barrier layer split into two or more coatings and separated by some or all of the more permeable substrate.

Surprisingly, this is not the case for the breakthrough time. The breakthrough time can depend critically on the way the barrier material is deployed. In particular, if half the barrier layer is put on one side of the more permeable substrate, and the other half is put on the other side, there can be much larger increases in breakthrough time when compared with putting all the barrier material on one side. The use of nanocomposite coatings to achieve this result is the subject of this invention.

The use of a clay nanocomposite approach to reduce the steady state permeation rate in polymers is well known. The reduction is caused by the tortuous path a diffusing molecule must take in order to get around all of the clay platelets. This leads to a decrease in the effective diffusion constant parallel to the direction normal to the plates. In an idealized system whereby the permeant does not swell or significantly change the polymer, and whereby the permeant has no specific interaction with or absorption on the clay surfaces, the effect is geometric, and depends only on the aspect ratio, concentration, and detailed dispersion of the plates. It does not depend on what molecule is diffusing through the polymer, or the solubility and/or diffusion rate in the polymer. Thus the change in diffusion constant for a given polymer when a particular nanocomposite is formed can be estimated from measurements with a convenient permeant. The result can be used to estimate the change for permeants that might be more expensive to test.

The solubility of molecules in inorganic filled polymers is typically reduced by the volume fraction taken up by the inorganic. This is true when there is no specific absorption at the polymer—inorganic interface. In addition, the presence of the filler may reduce any polymer swelling that would otherwise occur when the diffusing molecule dissolves in the polymer. This could further reduce the solubility.

Specific absorption at the clay polymer interface may also modify the effectiveness of the clay platelet in blocking the diffusion of a molecule. This is because the absorbed layer may facilitate transport along (and therefore around) the surface of the clay platelet.

The diffusion constant and solubility of a polymer not only determine the steady state diffusion rate, but also determine the time it takes for a critical amount of material to get through the polymer (breakthrough time). Thus, an understanding of the effect of making a clay polymer nanocomposite on the diffusion constant should enable us to understand both the steady state permeation rate and the changes in breakthrough time. The relationship of those quantities for different permeants is extremely important to the area of chemical warfare agent protection. Typically permeants that are not hazardous are used to develop new materials and glove design, while the final testing is done with the actual agents. We will discuss how measurements of changes in gas permeation rates are related to changes in chemical warfare agent breakthrough times in the limit that we can ignore swelling of the polymer phase, and we can ignore specific absorption at the clay-polymer interface. The value of this work is that it will provide guidance as to how important both swelling and specific absorption are to the measured breakthrough times, and thus help us design improved materials, in general. In addition, we will be able to show how the nanocomposite barrier layer is deployed within a multilayer glove can lead to large changes in observed breakthrough times.

In the steady state the permeation rate (flux) for a sheet of material of thickness t and permeability P that is maintained with a partial pressure difference for a single permeant of $\Delta p$ is given by:

$$\text{Flux} = \frac{A * \Delta p * P}{t}$$

The permeability of a material is the product of the diffusion constant D, and the solubility S $$P = D * S$$

In a nanocomposite, both the diffusion constant and solubility can be modified. When exfoliated clay platelets are used as the filler, and when there is no specific absorption of the permeant on the clay, the presence of the clay will reduce the solubility by the volume fraction of clay present. Thus in a composite with volume fraction $\phi$, the solubility S is given by:

$$S = (1-\phi)*S_0$$

where $S_0$ is the solubility of the unfilled polymer.

The Diffusion constant in a clay polymer nanocomposite can be approximated by the Cussler model with the following equation:

$$D = D_o * \left(1 + \frac{(\alpha*\phi)^2}{(1-\phi)}\right)$$

where $\alpha$ is the aspect ratio of the clay filler (i.e. the ratio of the plate thickness to its length or width), and where $D_0$ is the diffusion constant of the unfilled polymer. This result ignores many important features, but has been confirmed experimentally in several systems in that the roughly quadratic dependence on volume fraction is usually seen.

Another commonly used model is one originally developed by Nielsen which predicts the following functional form for the change in permeability with filler concentration and aspect ratio:

$$D = \frac{D_o}{1 + \Phi*\alpha}$$

This model predicts much smaller reductions in diffusion constant than the Cussler model, and does not agree with the data developed by the InMat group on nanocomposite coatings.

The aspect ratio used in the above equations is often difficult to predict, as it is typically not the aspect ratio of individual clay platelets, but some effective aspect ratio that also depends upon the degree of dispersion in the final nanocomposite that is important. The aspect ratio of an individual platelet used in the formulations used to make coatings that led to the data in the FIG. 1 was about 10,000. The nanocomposite fits a curve which implies that the effective aspect ratio is closer to 100.

When a barrier film consists of more than one layer, the effective permeability of the total multilayer composite can be calculated from the permeability of the individual layers from the following equation:

$$\frac{t}{P} = \frac{t_1}{P_1} + \frac{t_2}{P_2} + \frac{t_3}{P_3} + \ldots$$

where $P_1$ is the permeability of the first layer, $P_2$ is the permeability of the second layer, etc., and $t_1$ is the thickness of the first layer, $t_2$ is the thickness of the second layer, etc.

When using barrier coatings to reduce the flux through a substrate, it is also useful to define the reduction in steady state flux as $$R_{ss} = \frac{\left(\frac{t_1}{P_1}\right)}{\left(\frac{t}{P}\right)}$$

where layer 1 is defined in this case as the substrate layer on to which the barrier coatings are applied. It is important to note that when several barrier layers are used, the order does not change the steady state flux. The steady state flux doesn't change if a single barrier layer is broken into several thinner layers, as long as the total thickness of the barriers does not change.

Figure 2:
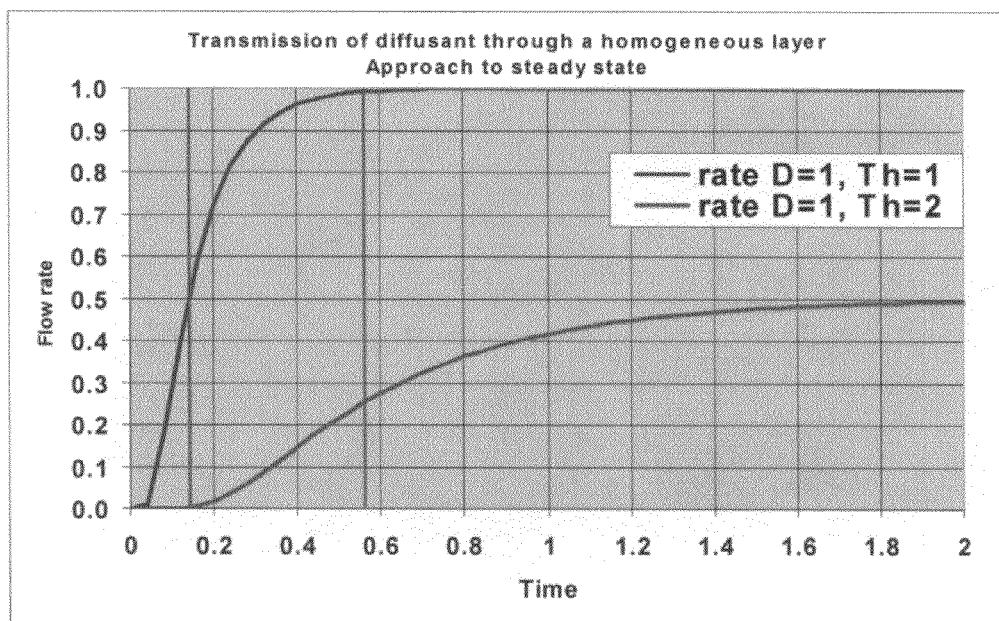
FIG. 2 is a plot of transmission of flow rate diffusant through a film versus time showing transient behavior.

A complete description of the time-dependent permeation across a uniform film is given by the solution of the one-dimensional diffusion equation with appropriate initial and boundary conditions. When swelling and concentration dependence of the diffusion coefficient can be ignored (normal or Fickian diffusion), the steady state solution is a uniform concentration gradient across the sample with a constant flow as given by the permeability relation described above. The transient behavior prior to achieving steady state can be described by a time-lag. The characteristic time dependence is shown in FIG. 2. There is an initial period before the leading edge of the concentration of penetrating molecules has reached the second surface where the flow is insignificant followed by a smooth rise to steady state.

Figure 3:
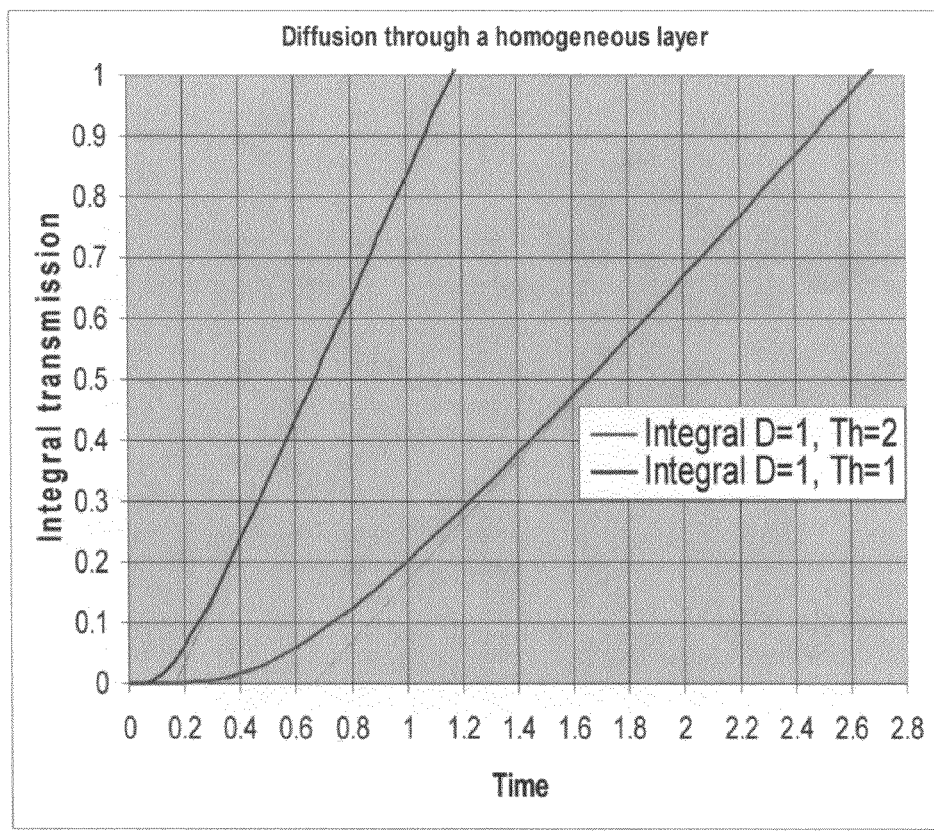
FIG. 3 shows the time integrated diffusion through a film and illustrates the time lag for diffusion through a film.

FIG. 3 shows the time-integrated molecular flow. The linear (steady state) portion of the curve has an intercept on the time axis commonly referred to as the time lag $T_{lag}$, and given by $$T_{lag} = \frac{t^2}{6D} \approx 0.1667 \frac{t^2}{D}$$

A different measure of the characteristic time scale of the approach to steady state is the time required to reach one half the steady state value $$T_{\frac{1}{2}} \approx 0.1388 \frac{t^2}{D}$$

For many chemical protection applications, what is important is a 'breakthrough time', the time required to reach a predefined concentration, often the minimum detectable concentration, on the protected side of a barrier layer. Clearly the time-lag in the diffusion kinetics increases the breakthrough time beyond what it would be if the initial flow rate were equal to the steady state rate. Furthermore, as shown in FIG. 2, a doubling of the layer thickness cuts the steady state flow by a factor of two but increases the time lag by a factor of four. Therefore the breakthrough time should be increased by more than a factor of two.

The time lag is dependent on the diffusion constant, not the solubility. Thus two films with equal permeability, one with twice the diffusion constant and the other with twice the solubility will have different time lags.

Another consequence of the time lag dependence on the diffusion constant only and not the solubility, is that careful transient flow measurements can provide determinations of both D and S.

A complete description of the approach to equilibrium in such systems rapidly becomes mathematically quite intractable. Nonetheless, methods have been developed which allow the calculation of the time lag without having to solve the complete transient diffusion problem. (Jaeger, J. C., Q. Appl. Math. 8, 187 (1950);Barrie, J. A., Levine, J. D., Michaels, A. S., and Wong, P., Trans. Faraday Soc., 59, 869 (1963); Ash, R., and Palmer, D. G., Br. J. Appl. Phys., 16, 873 (1965); Barrer, R. M., "Diffusion in Polymers" (Eds. J. Crank and G. S. Park), Chap. 6 Academic Press, New York (1968).)

The time lag for a two layer laminate is given by $$T_{lag12} = \frac{\frac{t_1^2}{D_1}\left(\frac{t_1}{6D_1S_1} + \frac{t_2}{2D_2S_2}\right) + \frac{t_2^2}{D_2}\left(\frac{t_1}{2D_1S_1} + \frac{t_2}{6D_2S_2}\right)}{\frac{t_1}{D_1S_1} + \frac{t_2}{D_2S_2}}$$

Note that the time lag expression for a laminate is dependent on the layer solubilities. The general expression for a three layer laminate may be expressed as shown in FIG. 4.

The result is somewhat complicated, but some general observations are useful. First, the overall time lag is not affected by interchange of the outer layers which is another way of saying that the time lag does not depend on the direction of flow through the laminate. Second, the overall time lag is affected by interchange of the center layer with either of the two outer layers, i.e., the order of the layers. Remember that such an interchange does not affect the steady state permeability.

Figure 5:
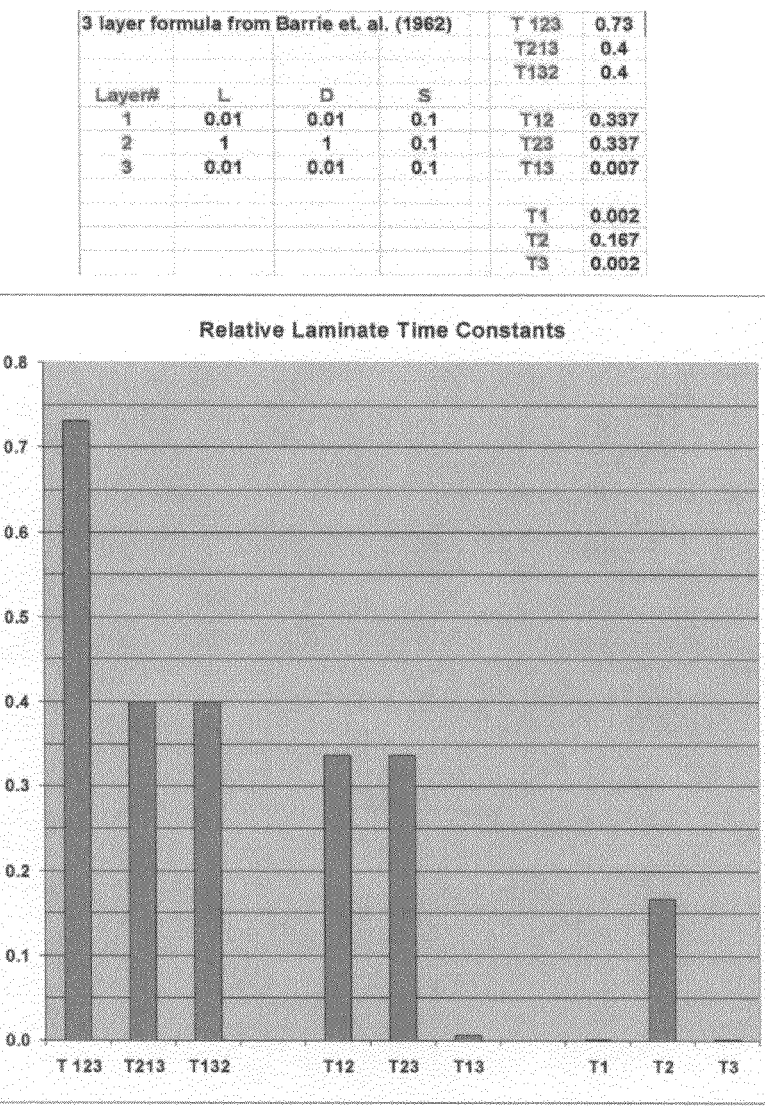
FIG. 5 illustrates relative laminate time constants for various multilayer structures.

The example shown in FIG. 5 is one where the outside layers provide the same steady state barrier properties as the inside layer, but where the diffusion constant (and thus steady state permeability) of the layers differ by a factor of 100.

The thin outside layers, if used by themselves, would have a very small lag time. On the other hand, when put on the thicker substrate, they lead to a significant increase in lag time. If they are put on one side, they increase the lag time by more than a factor of 2, and if put on opposite sides, the lag time is increased almost fivefold.

Figure 6:
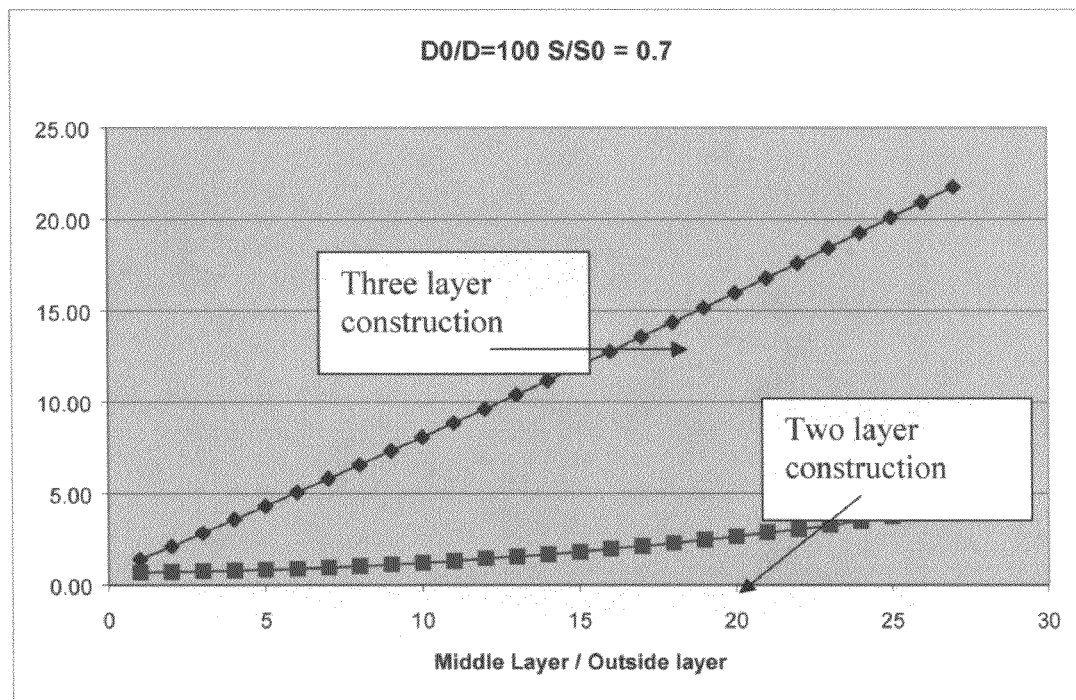
FIG. 6 is a plot of time lag for various multilayer structures.

FIG. 6 makes a similar point, as it shows the time lag for a three layer and two layer film having the same total amount of barrier coating. In this case, we plot the time lags as a function of the substrate (or central layer in the case of the three layer construction) thickness.

The conclusion from FIG. 6 is that when the barrier layers dominate the permeability, the time lag will be almost linear in the thickness of the central layer in a three layer construction.

This leads to the important conclusion that using a central layer with some internal porosity may be beneficial in providing improved breakthrough time in multilayer structures. When the central layer is porous, it will typically have a higher permeation rate. On the other hand, one can make it thicker at the same cost as a higher density thin substrate. In addition, the porosity may lead to solubility. This can further reduce the breakthrough time as the increased porosity acts as a sink for the penetrating molecules. Using the same amount of material in a foamed or porous state for the permeable substrate, in combination with very high barrier coatings on both sides, may be the most cost effective way to achieve high breakthrough times.

This approach can also be valuable when the substrate is paper. Paper substrates are typically very permeable, with high surface area and porosity. If such substrates are coated on both sides with nanocomposite barrier layers, significant improvements in breakthrough times will be observed. One application where this is very important is in the use of paper for grease barrier in food packaging.

One way to estimate what the flux versus time curve for a multilayer construction is to start with the data for a single layer, and rescale it using the calculated changes in lag time and steady state flux. Starting with the data for the 30 mil MAPA neoprene glove (Lindsay, R. S., Longworth, T. L., Johnson, M. A., Baranoski, J. M., Hannigan, J. B.; "Domestic Preparedness Program, Liquid Sulfur Mustard and Sarin Challenge/Vapor Penetration Swatch Testing of Glove Set", Chemical Protective NSN: 8415-01-033-3517; report #ERDEC-TR-536; October, 1998.), we show the calculated flux versus time for three coatings on that glove:
15 microns on one side
30 microns on one side
15 microns on both sides (total 30 microns)
The barrier layers were assumed to have 50 times lower diffusion constant than the MAPA neoprene, but the same solubility. Calculation results appear in FIG. 7.

Figure 7:
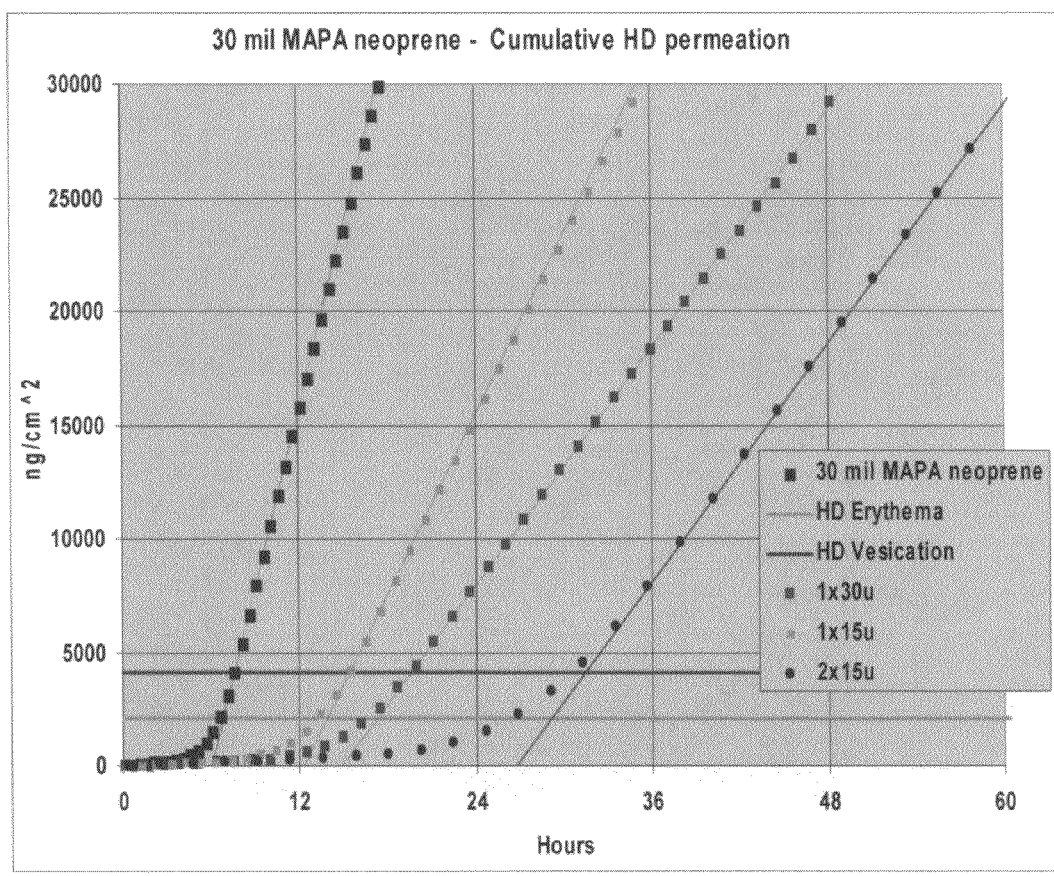
FIG. 7 is a plot of flux versus time for various substrates.

FIG. 7 indicates that the three layer construction will have more than a 24 hour breakthrough time. It also shows how the lag time tends to dominate the breakthrough time in these materials.

Since we have an estimate of the lag time for a thin nitrile rubber glove (Lindsay, R. S., Longworth, T. L., Johnson, M. A., Baranoski, J. M., Hannigan, J. B.; "Domestic Preparedness Program, Liquid Sulfur Mustard and Sarin Challenge/Vapor Penetration Swatch Testing of Glove Set", Chemical Protective NSN: 8415-01-033-3517; report #ERDEC-TR-536; October, 1998.), we have decided to use that in a model whereby the central layer is the nitrile rubber, and the outside layers are 1 mil thick barrier coating with either 30 times lower diffusion constant or 100 times lower diffusion constant. The time lag for both a three layer structure and for a two layer structure with two mils of barrier coating on one side of the nitrile rubber are shown in FIGS. 8a and 8b.

Figure 8A:
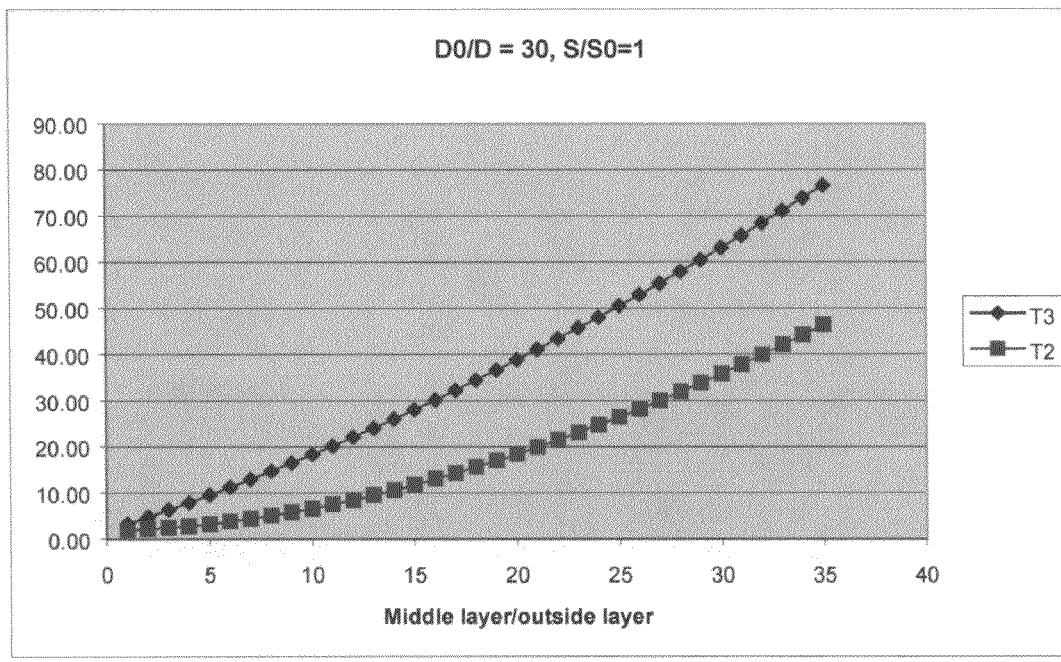
FIGS. 8a and 8b illustrate breakthrough times for various multilayer barrier structures.
Figure 8B:
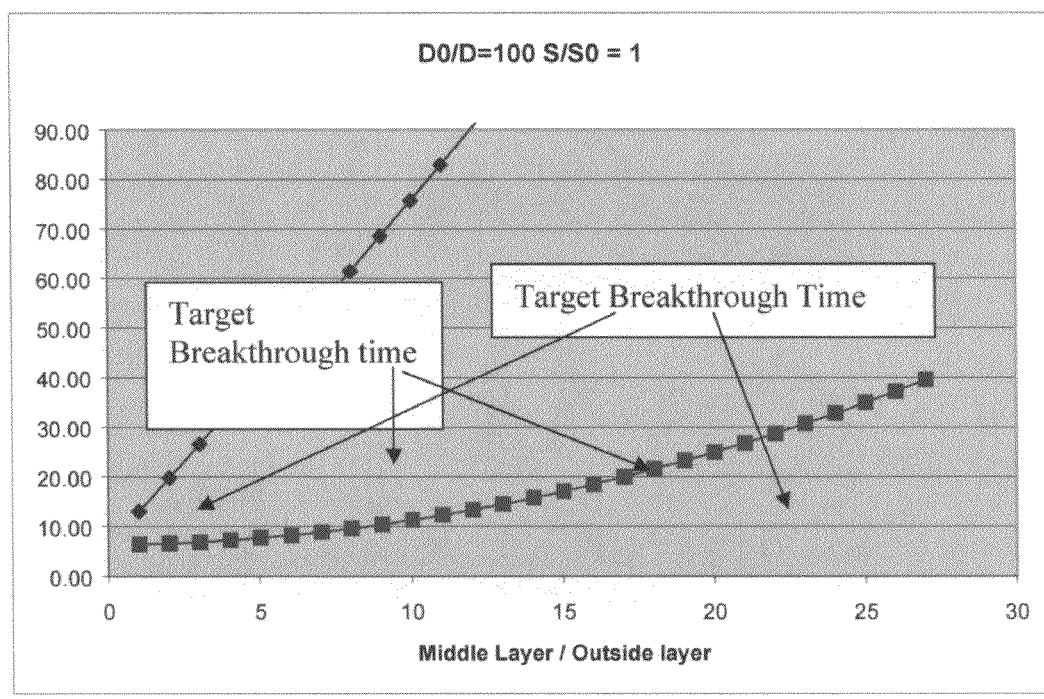

The curves of FIGS. 8a and 8b show that a three layer construction with a barrier coating only 30 times less permeable than the unfilled nitrile rubber could reach a 24 breakthrough time for mustard gas with a total thickness of about 15 mils (13 mils unfilled nitrile, 2 mils barrier material). A two layer construction would have to be more than 25 mils thick.

If we can reduce the permeability to mustard gas by a factor of 100 (as we have for oxygen), then a three layer construction is even more advantageous. In that case, the model indicates that about 5 mils (three for the central layer, and two for the barrier coating) is all that might be needed. On the other hand, a two layer construction would have to be more than 20 mils thick.

Depending upon the type of polymer in the nanocomposite and the application, different thicknesses of the nanocomposite can be used. As is shown above, the elastomeric nanocomposite layers can be mils thick. However, in the packaging industry, non-elastomeric nanocomposites can be used as low as 0.1 microns coat weight and in some cases even lower. The thickness of the nanocomposite layer will depend on the thickness and the permeability of the central layer. Upon studying the models and applying them to the application and materials in the application, the nanocomposite layer can be calculated to achieve the necessary properties. The same calculations can be done if the nanocomposite layers are fixed and the central layer can be modified. One can calculate the necessary central layer thickness to achieve the target properties. Typical thicknesses for the intermediate layer may be from about 2 to about 100 mils or from 5 to 100 mils in some case. Thicknesses for the nanocomposite layers are preferably from 0.1 microns to 125 microns or from 0.1 mil to 5 mils in some cases.

Helium Testing of Multilayer Structures
Natural Rubber/Butyl Nanocomposite Multilayers The principles outlined above have been demonstrated with helium permeability measurements made using an internally developed apparatus. Prior to a measurement, a sample is thoroughly degassed from both sides with a vacuum pump. The system determines gas transmission through a sample by exposing one side of the sample to a step change in gas pressure and measuring the rise in pressure in a known volume on the other side of the sample with a capacitance manometer. The pressure vs. time data is acquired and a numerical derivative calculated which is used to determine both the steady-state permeability and the initial kinetics of the gas transmission.

The samples measured in this study were as follows:
Uncoated natural rubber, nominal 0.030" thickness
Coat A, natural rubber coated one layer on one side with Air D-Fense™ 2000R (commercially available butyl nanocomposite, InMat Inc.)
Coat AB, natural rubber coated two layers on either side with Air D-Fense™ 2000R (commercially available butyl nanocomposite, InMat Inc.)
Coat AA, natural rubber coated two layers on the same side with Air D-Fense™ 2000R (commercially available butyl nanocomposite, InMat Inc.).

Figure 9:
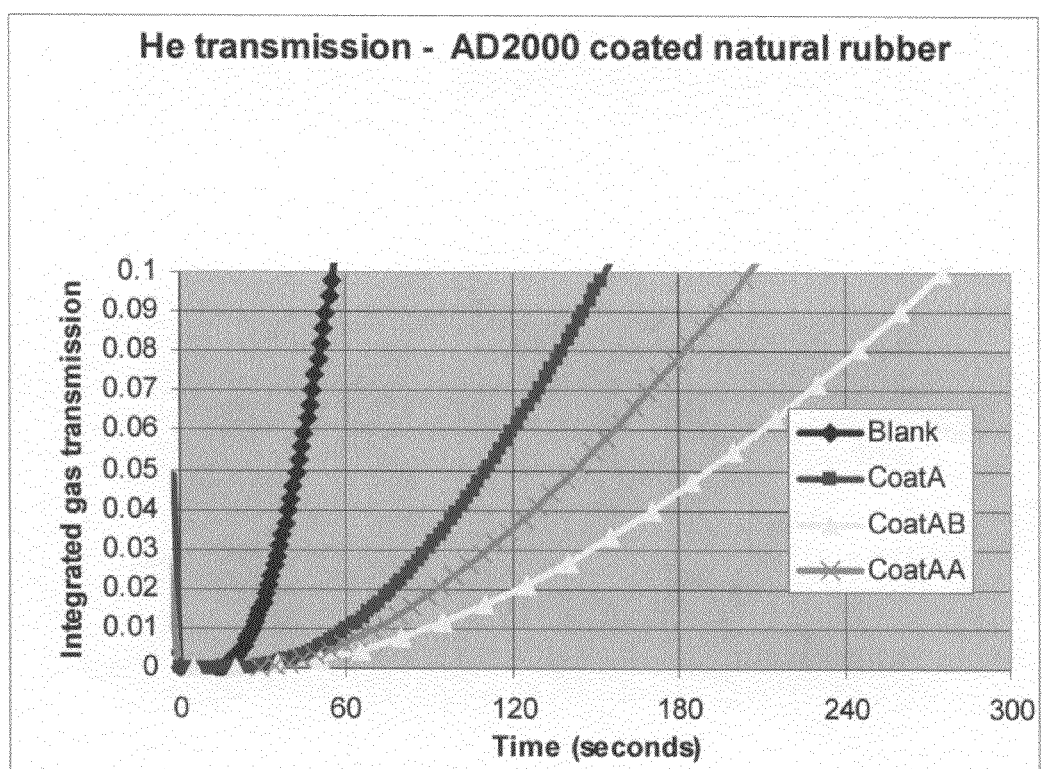
FIGS. 9 and 10 show barrier properties of various structures with respect to helium.
Figure 10:
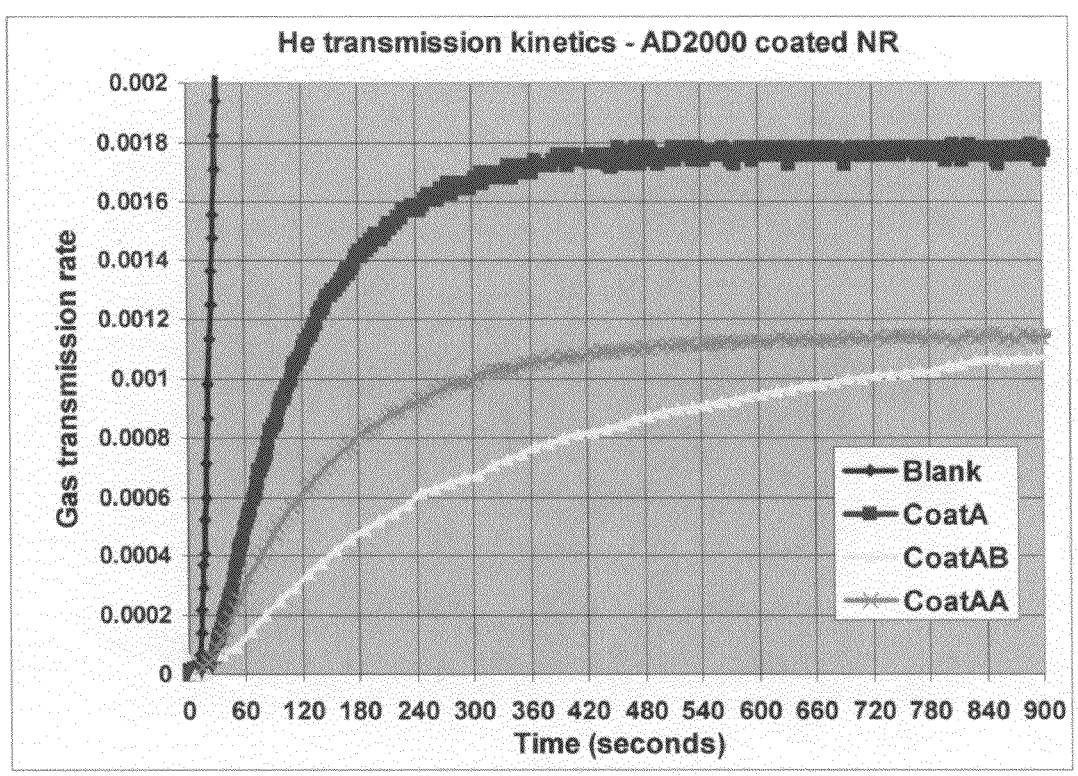

The samples measured in this study were prepared using thin gauge (nominal 0.030") natural latex rubber sheet obtained from McMaster-Carr. Three samples were spray coated with AD2000 and allowed to air dry. Two of these were then given a second spray coating, one on the same previously coated side and the second on the reverse side. An attempt was made to have each coat deposit the same amount of material. For details on the sample preparation, refer to the examples section. Results are summarized in FIGS. 9 and 10 and Table 1, below.

TABLE 1

Helium Transmission Rates

| Sample | Experimental | | Calculated | |
|---|---|---|---|---|
| | T ½* | Helium transmission rate* | T ½* | Helium transmission rate* |
| natural rubber control | 1 | 1 | 1 | 1 |
| Coated A | 2.4 | 0.29 | 2.4** | 0.29** |
| Coated AA | 2.7 | 0.20 | 2.7 | 0.17 |
| Coated AB | 6.2 | 0.21 | 8.9 | 0.17 |

*All data shown are relative to the values for uncoated natural rubber 0.8 mm thick.
**The relative diffusion constants and solubility needed for the model calculations were obtained by fitting the coated A sample data. Thus these calculated values are constrained to fit the experimental values.

The data shows that putting a coating on two sides of the sample instead of on one side increases the time it takes to reach half the steady state permeation rate by more than a factor of 2. The lag times obtained by extrapolating the long time integrated gas flux back to the intercept with the time axis are also increased by more than a factor of 2.

In order to determine a breakthrough time, one needs to pick a threshold value of the integrated gas flux. Using the data shown in FIG. 9, any choice of integrated flux between 0.01 and 0.09 has the breakthrough time increasing by between 32% and 45%. This is a significant increase, although much lower than expected from both the modeling and the measured half time to steady state and the lag time. The reason for this is a combination of measurement sensitivity at low integrated flux, coating inhomogeneity, and possible defects in the coating. Nonetheless, the data demonstrates the effectiveness of using two nanocomposite coatings separated by a permeable layer in providing significant increases in breakthrough time.

Neoprene/Neoprene Nanocomposite Multilayer Structures

We also studied samples of multilayer neoprene/neoprene nanocomposite as an example of a proposed protective glove design. This work was done by spray coating flat sheets. Thickness control was difficult, and is the largest source of error when comparing with the modeling results. For details on sample preparation, refer to the examples section.

We compared two thicknesses of unfilled Neoprene with two multilayer Neoprene structures. The structures used are shown in FIG. 11.

Figure 11:
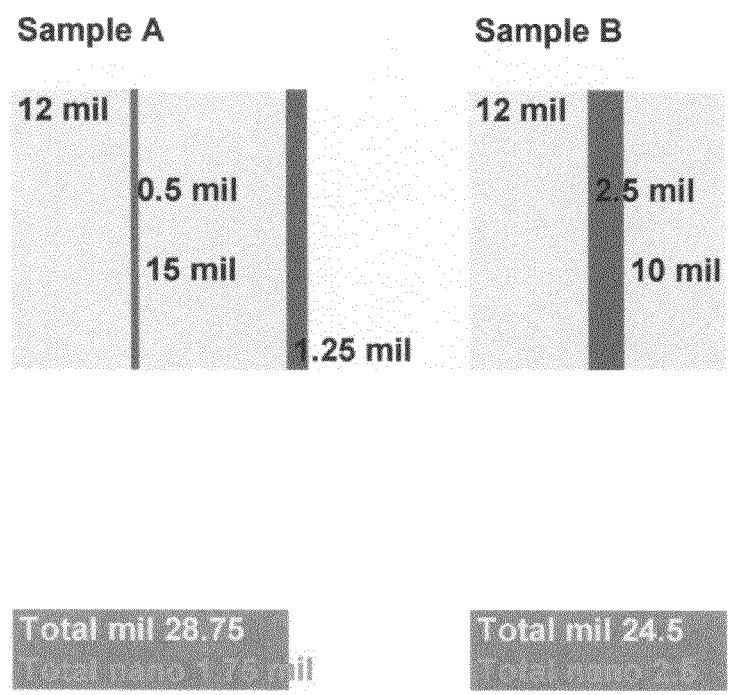
FIG. 11 illustrates some neoprene/nanocomposite structures used for diffusion testing.

The thicknesses shown in FIG. 11 were the thicknesses of each layer as deposited. The actual total thickness of sample A when measured using a micrometer was 30 mils (very close to the target) but sample B was measured by micrometer to be only 19.5 mils thick.

The same multilayer modeling discussed above (but generalized to cover up to five different layers) was used. The control Neoprene results were used to fix the solubility and diffusion constant of Neoprene. The steady state helium permeation was used to determine the change in the diffusion constant in the nanocomposite layers. It was found to be about 100 times lower than the unfilled Neoprene. The target thicknesses of sample B were reduced by a constant factor so that the total thickness matched the measured thickness. The lag times and steady state permeability of each sample was then calculated and compared with the measured half time for reaching steady state. These are not the same. In a homogeneous sample, they are simply proportional to each other. If we assume that is approximately true here also, than the procedure described above can be used to assess the utility of the modeling. Results are seen in Table 2.

TABLE 2

Helium Transmission Rates

| Sample | T½ exp | Tlag | Helium transmission rate | | Total Thickness mil |
|---|---|---|---|---|---|
| | | | Experiment | Calculated | |
| Control 1 | 17 | 17 | 0.67 | 0.67 | 16.0 |
| Control 2 | 43 | 45 | 0.38 | 0.42 | 25.8 |
| B | 120 | 77 | 0.029 | 0.025 | 19.2 |
| A | 250 | 353 | 0.045 | 0.041 | 30.0 |

The primary conclusions from this experiment are:
Even though sample B has much more barrier coating, and lower steady state permeability than Sample A, it will have a much shorter breakthrough time.
The experimental results for the kinetics of sample B were not slowed as much as expected from the model. We expect that this is due to poor thickness control, and the kinetics being dominated by the thinner regions.

Mustard Gas Testing on Nanocomposite Multilayers

Multilayer nanocomposite samples were submitted to GEOMET Technologies Inc. for testing as per MIL-STD-282, Military Standard Filter Units, Protective Clothing, Gas-Mask Components and Related Products, Method 209.1: HD Resistance of Impermeable Materials (Static Diffusion Method). The closed top liquid agent contamination/vapor penetration (LAC/VP) test results are presented in the table below. Details on sample preparation are in the example section. Results appear in Table 3, below.

TABLE 3

Mustard Gas Breakthrough

| Sample | Substrate | Coating (both sides) | Breakthrough Time* (integrated flux) |
|---|---|---|---|
| HD1 | Polypropylene 1 mil | none | 8-12 hours (4.4 µg/cm2) |
| HD2 | | 2 mil Air D-Fense 2000 | 12-24 hours (3.1 µg/cm2) |
| HD3 | Natural Rubber 32 mils | none | 0-2 hours (5 µg/cm2) |
| HD4 | | 2 mil Air D-Fense 2000 | 8-12 hours (10 µg/cm2) |
| HD5 | Neoprene 18 mils | none | 0-2 hours (80.4 µg/cm2) |
| HD6 | | 2 mil Air D-Fense 2000 | 6-8 hours (4.2 µg/cm2) |
| HD7 | Neoprene 18 mils | 1.4 mil Neoprene nanocomposite | 2-4 hours (6.4 µg/cm2) |
| HD8 | Neoprene 18 mils | 1 mil Air D-Fense 2000 one side, 0.5 mil Neoprene nanocomposite other side | 4-6 hours (22.6 µg/cm2) |

*Breakthrough time is defined as the time it takes for the integrated flux to reach 4 µg/cm$^2$.

All these examples show a very significant increase in breakthrough time when a nanocomposite barrier coating is on both sides of a substrate. The smallest improvement was on the polypropylene substrate (sample HD2). This material started with the best barrier properties to mustard gas, and was also the thinnest ~1 mil) substrate. The improvement on the Neoprene substrate (sample HD6) was the next largest, and the improvement on the natural rubber (sample HD4) was largest. This is consistent with the models which show the improvement in breakthrough time increasing significantly with the substrate thickness. Without a detailed understanding of the models, this would be surprising. This is a direct example that demonstrates the subject invention of this patent because the substrate does not provide a significant part of the steady state barrier. When Neoprene or natural rubber is used with the Air D-Fense 2000 barrier coating, the barrier coating provides most of the steady state barrier, regardless of the substrate thickness, as expected. On the other hand, we find that the thickness of the substrate, and the placement of the nanocomposite coating on both sides of the substrate, is critical to achieving a large improvement in breakthrough time for all these samples.

The results using Neoprene nanocomposite also showed a significant increase in breakthrough time. Although the Neoprene nanocomposite has slightly lower oxygen permeability as compared with Air D-Fense™ 2000 (butyl based nanocomposite), it was not as effective against mustard gas. Nonetheless, these examples demonstrate the use of this approach in making a multilayer barrier structure with large improvements in breakthrough time while using the same type of polymer (i.e. Neoprene, sample HD7) in all layers. The barrier layers are nanocomposites of the substrate polymer, with the central unfilled layer more permeable than the barrier layers.

The last entry in the table (sample HD8) demonstrates that different nanocomposites can be used for the top and bottom layers, and one can still achieve large improvements in the breakthrough time. Therefore, different polymers can be targeted for use depending on the secondary properties of the application, providing more flexibility in polymer choice.

The nanocomposite multilayers utilized in accordance with the invention may be prepared as described below.

EXAMPLES

Helium Testing
Natural Rubber with Butyl Nanocomposite Multilayers

The samples measured in this study were prepared using thin gauge (nominally 0.030") natural rubber sheet obtained from McMaster-Carr. Three samples were prepared for helium transmission rate testing as follows:

Coat A Sample: One side of the natural rubber was spray coated with Air D-Fense™ 2000R, a commercially available aqueous butyl nanocomposite from InMat® Inc. This coating was air dried resulting in a coating thickness of approximately 25-35 microns.

Coat AB Sample: One side of the natural rubber was spray coated with Air D-Fense™ 2000R, a commercially available aqueous butyl nanocomposite from InMat® Inc. This coating was air dried resulting in a coating thickness of approximately 25-35 microns. Once the coating was dry, the natural rubber was turned over and sprayed again. An attempt was made to have each coat deposit the same amount of material. The coating was air dried.

Coat AA Sample: : One side of the natural rubber was spray coated with Air D-Fense™ 2000R, a commercially available aqueous butyl nanocomposite from InMat® Inc. This coating was air dried resulting in a coating thickness of approximately 25-35 microns. Once the coating was dry, the natural rubber was sprayed again. An attempt was made to have each coat deposit the same amount of material. The coating was air dried resulting in 2 times the coating thickness on the one side.

Neoprene with Neoprene Nanocomposite Multilayers

The samples measured in this study were prepared on a glass plate and all layers were spray coated from aqueous latex formulations. The different layers are described below:

Unfilled Neoprene Layer

In a 32 oz glass jar, 250 grams of Neoprene 571 (Dow DuPont Elastomers, 49.8%) and 250 grams of Neoprene 842A (Dow DuPont Elastomers, 50.9%) were placed with a stir bar. To this solution were added 0.2 grams of Silwet L77 (OSI Specialties) and 12 phr (part per hundred rubber) of Zinc Oxide (R. T. Vanderbilt Co, Inc., 60%). This solution was stirred until ready for use.

Neoprene Nanocomposite Layer:

The MICROLITE® exfoliated silicate (W. R. Grace, 7.5%) was treated using the following procedure:

In a 500 mL plastic jar with a lid was weighed 64.9 grams of MICROLITE® 963. To this dispersed silicate filler was added 7.9 grams of ammonium hydroxide (Mallickrodt, 17%) in 16 grams of distilled water. The resulting dispersion was mixed for 72 hours in the closed container at room temperature.

In an 8 oz jar, 0.64 grams of ACUSOL® 880 (35.2%, Rohm & Haas), 1.27 grams of ACUSOL® 882 (17.1%, Rohm & Haas), 2.65 grams of 17% ammonium hydroxide (Mallinckrodt), 0.3 grams of Chemwet 29 (ChemCOR), 0.6 grams of Zonyl 8952 (DuPont) and 21.3 grams of distilled water were weighed. A stir bar was added and the solution was stirred slowly overnight. To this solution was added a mixture of 13.1 grams of Neoprene 571 (Dow DuPont Elastomers, 49.8%), 1.24 grams of Zinc Oxide (R.T. Vanderbilt Co. Inc. 60%) and 10.8 grams of distilled water. The resulting solution was mixed thoroughly.

To the above solution, the treated filler, 0.46 grams of glycerin (Lab Chem Inc., 50%) and 9 grams of distilled water were added. The resulting solution was stirred with a stir bar. The resulting dispersion at room temperature is ready for application.

Neoprene Nanocomposite Multilayer A

This multilayer was prepared by spraying two layers of the unfilled Neoprene latex resulting in 12 mil of unfilled Neoprene. After complete drying, the Neoprene nanocomposite was sprayed in one layer resulting in 0.5 mil of Neoprene nanocomposite. The unfilled Neoprene was sprayed onto the dried layer in 2 passes resulting in 15 mil of unfilled Neoprene. Finally, the Neoprene nanocomposite was sprayed onto the dried Neoprene layer in 1 pass resulting in 1.25 mil of Neoprene nanocomposite. After complete drying, the multilayer was removed from the glass plate and ready for testing.

Neoprene Nanocomposite Multilayer B

This multilayer was prepared by spraying two layers of the unfilled Neoprene latex resulting in 12 mil of unfilled Neoprene. After complete drying, the Neoprene nanocomposite was sprayed in one layer resulting in 2.5 mil of Neoprene nanocomposite. The unfilled Neoprene was sprayed onto the dried layer in 2 passes resulting in 10 mil of unfilled Neoprene. After complete drying, the multilayer was removed from the glass plate and ready for testing.

Mustard Gas Testing

Polypropylene with Butyl Nanocomposite Multilayers

The samples measured in this study were prepared using thin gauge (nominally 20 microns) polypropylene sheet obtained from Hostaphan. One side of the polypropylene was spray coated with Air D-Fense™ 2000, a commercially available aqueous butyl nanocomposite from InMat® Inc. This coating was air dried resulting in a coating thickness of approximately 25-35 microns. Once the coating was dry, the polypropylene was turned over and sprayed again. An attempt was made to have each coat deposit the same amount of material. The coating was air dried and sent out for testing.

Natural Rubber with Butyl Nanocomposite Multilayers

The samples measured in this study were prepared using 0.030" natural rubber sheet obtained from McMaster Carr. One side of the natural rubber was spray coated with Air D-Fense™ 2000, a commercially available aqueous butyl nanocomposite from InMat® Inc. This coating was air dried resulting in a coating thickness of approximately 25-35 microns. Once the coating was dry, the natural rubber was turned over and sprayed again. An attempt was made to have each coat deposit the same amount of material. The coating was air dried and sent out for testing.

Neoprene with Butyl Nanocomposite Multilayers

The samples measured in this study were prepared using 18 mil Neoprene glove obtained from Lab Safety Supply and cut into appropriate sections for use. One side of the Neoprene was spray coated with Air D-Fense™ 2000, a commercially available aqueous butyl nanocomposite from InMat® Inc. This coating was air dried resulting in a coating thickness of approximately 25-35 microns. Once the coating was dry, the Neoprene was turned over and sprayed again. An attempt was made to have each coat deposit the same amount of material. The coating was air dried and sent out for testing.

Neoprene with Neoprene Nanocomposite Multilayers

The samples measured in this study were prepared using 18 mil Neoprene glove obtained from Lab Safety Supply and cut into appropriate sections for use. One side of the Neoprene was spray coated with Neoprene nanocomposite (see description above for preparation). This coating was air dried resulting in a coating thickness of approximately 15-20 microns. Once the coating was dry, the Neoprene was turned over and sprayed again. An attempt was made to have each coat deposit the same amount of material. The coating was air dried and sent out for testing.

Neoprene with Neoprene Nanocomposite and Butyl Nanocomposite Multilayers

The samples measured in this study were prepared using 18 mil Neoprene glove obtained from Lab Safety Supply and cut into appropriate sections for use. One side of the Neoprene was spray coated with Neoprene nanocomposite (see description above for preparation). This coating was air dried resulting in a coating thickness of approximately 7-15 microns. Once the coating was dry, the Neoprene was turned over and sprayed with Air D-Fense™ 2000, a commercially available aqueous butyl nanocomposite from InMat® Inc. This coating was air dried resulting in a coating thickness of approximately 20-30 microns. The coating was air dried and sent out for testing.

What is claimed is:

1. A multilayer barrier structure comprising:
   (a) a first nanocomposite layer including a first polymer and a first exfoliated filler wherein the first exfoliated filler is a silicate having an aspect ratio greater than 25 and wherein the layer exhibits an at least 50-fold reduction in gas permeability as compared with a coating formed from the first polymer alone;
   (b) a second nanocomposite layer including a second polymer and a second exfoliated filler wherein the second exfoliated filler is a silicate having an aspect ratio greater than 25 and wherein the layer exhibits an at least 50-fold reduction in gas permeability as compared with a coating formed from the second polymer alone;
   (c) at least one intermediate layer disposed between the first and second nanocomposite layers, the intermediate layer including a material selected from the group consisting of: synthetic elastomers, non-elastomeric synthetic polymers, natural non-elastomeric polymers, including films, fabrics, nonwovens, papers or foams comprising the aforesaid polymers, and further wherein the multilayer structure exhibits a breakthrough time at least 30% higher than it would be if the two barrier layers were combined in a single layer on one side of the intermediate layer.

2. The multilayer structure according to claim 1, wherein the first and second polymers are the same polymer.

3. The multilayer barrier structure according to claim 1, wherein the intermediate layer comprises a synthetic elastomer selected from the group consisting of butyl rubber, ethylene-propylene terpolymers, and neoprene.

4. The multilayer structure according to claim 1, wherein the first and second exfoliated fillers are the same filler.

5. The multilayer structure according to claim 1, wherein said first and second exfoliated fillers are independently selected from the group consisting of bentonite, vermiculite, montmorillonite, nontronite, beidellite, volkonskoite, hectorite, saponite, laponite, sauconite, magadiite, kenyaite, ledikite and mixtures thereof.

6. The multilayer structure according to claim 1, wherein the first and second fillers are vermiculite.

7. The multilayer structure according to claim 1, exhibiting a breakthrough time at least 50% higher than that of a corresponding structure wherein the nanocomposite layers are integral with or adjacent each other.

8. The multilayer structure according to claim 1, wherein the first and second nanocomposite layers have a thickness of between about 0.1 microns and 125 microns.

9. The multilayer structure according to claim 1, wherein said intermediate layer has a thickness of from about 2 mils to about 100 mils.

10. The multilayer barrier structure according to claim 1, wherein the first nanocomposite layer has an exfoliated silicate filler content of from 10% to 50% by weight and the second nanocomposite layer has an exfoliated silicate filler content of from 10% to 50% by weight.

11. A multilayer structure comprising at least three layers,
(a) two nanocomposite barrier layers which layers contain exfoliated silicate filler and polymer wherein the individual layers have an oxygen permeability that is at least 50 times lower than the unfilled polymer,
(b) an intermediate layer disposed between the barrier layers which has an oxygen permeation rate that is at least two times higher than the two barrier layers,
(c) whereby a breakthrough time is at least 30% longer than it would be if the two barrier layers were combined into a single layer on one side of the more permeable substrate layer.

12. The multilayer structure according to claim 11, exhibiting a breakthrough time at least 50% higher than that of a corresponding structure wherein the nanocomposite layers are integral with or adjacent each other.

13. The multilayer structure according to claim 11, wherein the solubility of the oxygen in the barrier layers and the substrate layer do not differ by more than a factor of 10.

14. The multilayer structure according to claim 11, wherein the intermediate layer includes a material selected from the group consisting of synthetic elastomers[, non-elastomeric synthetic polymers, natural non-elastomeric polymers, including films, fabrics, nonwovens, papers or foams comprising the aforesaid polymers.

15. The multilayer structure according to claim 11, wherein the two nanocomposite barrier layers have an exfoliated silicate filler content of from 10% to 50% by weight.

16. A composite packaging material comprising:
(a) a paper substrate;
(b) multilayer barrier structure adhered thereto, wherein the multilayer barrier structure comprises:
(i) a first nanocomposite layer including a first polymer and a first exfoliated filler wherein the first exfoliated filler is a silicate having an aspect ratio greater than 25 and wherein the layer exhibits an at least 50-fold reduction in gas permeability as compared with a coating formed from the first polymer alone;
(ii) a second nanocomposite layer including a second polymer and a second exfoliated filler wherein the second exfoliated filler is a silicate having an aspect ratio greater than 25 and wherein the layer exhibits an at least 50-fold reduction in gas permeability as compared with a coating formed from the second polymer alone;
(iii) at least one intermediate layer disposed between the first and second nanocomposite layers, the intermediate layer including a material selected from the group consisting of synthetic elastomers, non-elastomeric synthetic polymers, natural non-elastomeric polymers, including films, fabrics, nonwovens, papers or foams comprising the aforesaid polymers and further the multilayer structure exhibiting a breakthrough time at least 30% higher than that of a corresponding structure wherein the nanocomposite layers are integral with or adjacent each other.

17. The composite according to claim 16, wherein the intermediate layer is selected from the group consisting of butyl rubber, ethylene-propylene terpolymers, and neoprene.

* * * * *